(12) United States Patent
Gratton et al.

(10) Patent No.: US 10,469,881 B2
(45) Date of Patent: Nov. 5, 2019

(54) METHODS AND APPARATUS FOR RESPONDING TO INOPERATIVE COMMANDS

(71) Applicant: Dish Network L.L.C., Englewood, CO (US)

(72) Inventors: Max Stephen Gratton, Parker, CO (US); Mark Templeman, Parker, CO (US); Danny Jean Minnick, Castle Rock, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 15/858,405

(22) Filed: Dec. 29, 2017

(65) Prior Publication Data

US 2019/0208233 A1    Jul. 4, 2019

(51) Int. Cl.
*H04N 21/231* (2011.01)
*H04N 21/6587* (2011.01)
*H04N 21/218* (2011.01)
*H04N 21/2665* (2011.01)
*H04N 21/235* (2011.01)
*H04N 21/472* (2011.01)
*H04N 21/433* (2011.01)

(52) U.S. Cl.
CPC ..... *H04N 21/231* (2013.01); *H04N 21/21815* (2013.01); *H04N 21/2353* (2013.01); *H04N 21/2665* (2013.01); *H04N 21/4333* (2013.01); *H04N 21/47217* (2013.01); *H04N 21/6587* (2013.01)

(58) Field of Classification Search
None
See application file for complete search history.

(56) References Cited

U.S. PATENT DOCUMENTS

| | | | | |
|---|---|---|---|---|
| 2014/0006079 | A1* | 1/2014 | Keohane | G06Q 10/1093 705/7.19 |
| 2014/0006951 | A1* | 1/2014 | Hunter | H04H 60/31 715/719 |
| 2015/0046965 | A1* | 2/2015 | Shanson | H04N 5/04 725/116 |
| 2015/0296033 | A1* | 10/2015 | Jung | G06Q 50/01 709/217 |
| 2017/0337711 | A1* | 11/2017 | Ratner | G06K 9/6267 |

* cited by examiner

*Primary Examiner* — Justin E Shepard
(74) *Attorney, Agent, or Firm* — Perkins Coie LLP

(57) ABSTRACT

Systems, apparatus, and methods are described for responding to inoperative commands on a server device. In some embodiments, the disclosed technology facilitates pausing of content being played on a device without creating a bookmark of the location in the content at which the content was paused. In response to receiving the request to pause the content from playing, the server device generates a pause instruction to pause the content from playing. Upon expiry of a timeout interval, the server device automatically transforms the pause instruction into a stop instruction, which when executed causes stopping the content from playing. In some embodiments, the server device detects an user interaction event, prior to expiry of the timeout interval. Non-limiting examples of the user interaction may be shutting down the server device, switching from the content to a live broadcast program, switching from the content to another content, or exiting from the content.

20 Claims, 7 Drawing Sheets

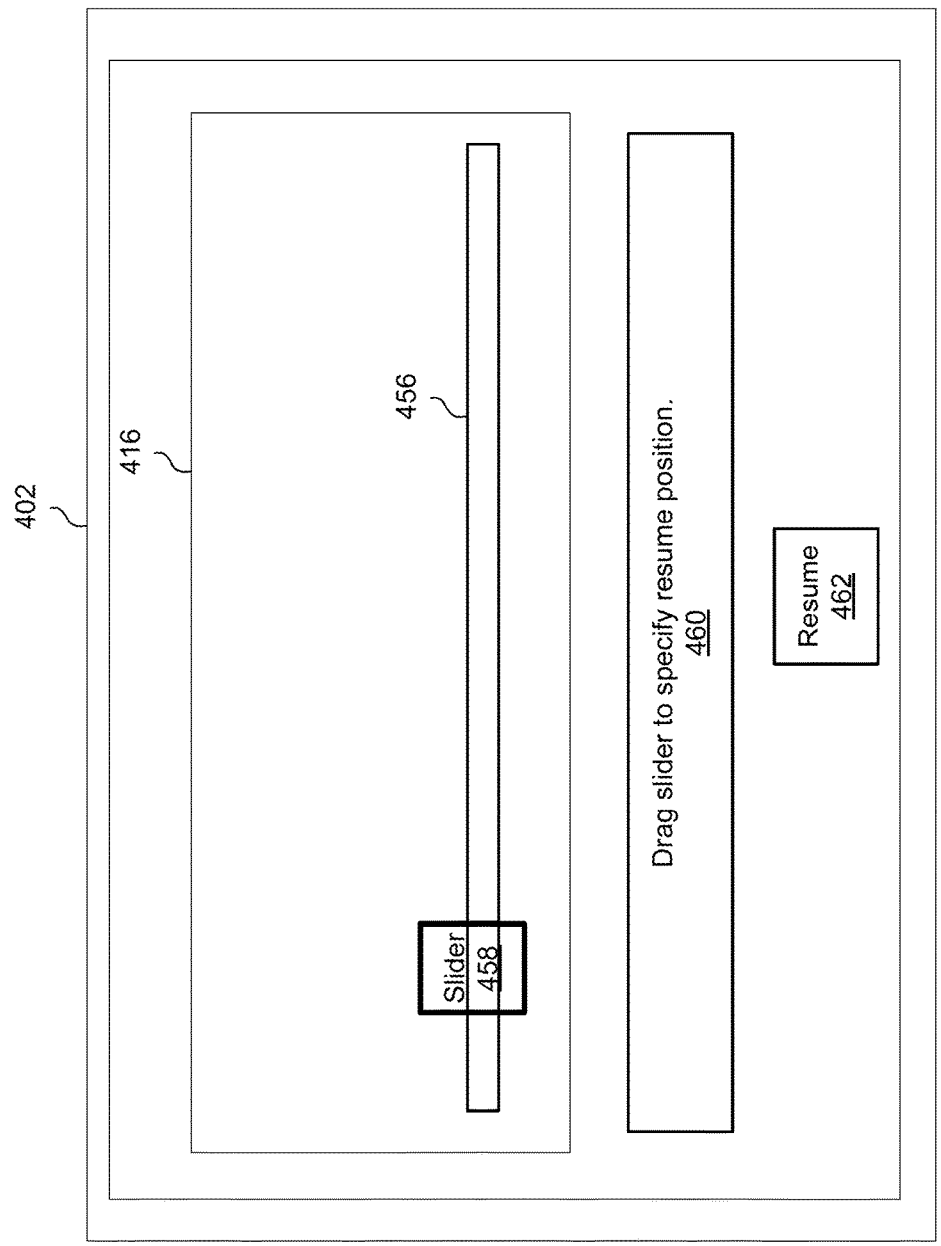

METHODS AND APPARATUS FOR RESPONDING TO INOPERATIVE COMMANDS

BACKGROUND

Devices, such as set-top boxes for satellite and cable television services, allow a user to view content from a variety of media sources. These devices can be generally classified as server devices or client devices. In some instances, a user playing content on a first device may wish to pause the content from playing on a device, and exit the content to switch to another content, or pull up an electronic program guide (EPG). Consequently, there is a need for methods and systems that facilitate pausing and/or stopping content on a device in response to one or more user interaction events.

SUMMARY

Disclosed embodiments are directed at systems, methods, and apparatus for responding to inoperative commands. The method includes outputting the content for display on a monitor coupled to the server device; receiving a request to pause the content from playing on the server device; in response to receiving the request to pause the content from playing: generating a pause instruction to pause the content from playing; in response to determining expiry of a timeout interval from a time stamp of generating the pause instruction: transforming the pause instruction into a stop instruction to stop the content from playing; executing the stop instruction to stop the content from playing; in response to detecting a user interaction event prior to expiry of a timeout interval from a timestamp of executing the pause instruction: outputting a message for display on the monitor coupled to the server device prompting user selection of an option for confirming stopping the content from playing; upon receiving user selection of the option for stopping the content from playing: generating a stop instruction to stop the content from playing; executing the stop instruction to stop the content from playing; saving, at a storage location, logical information corresponding to the stop instruction.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

FIGS. 4A and 4B illustrate example screens associated with a server/client device.

DETAILED DESCRIPTION OF THE DRAWINGS

Figure 1:
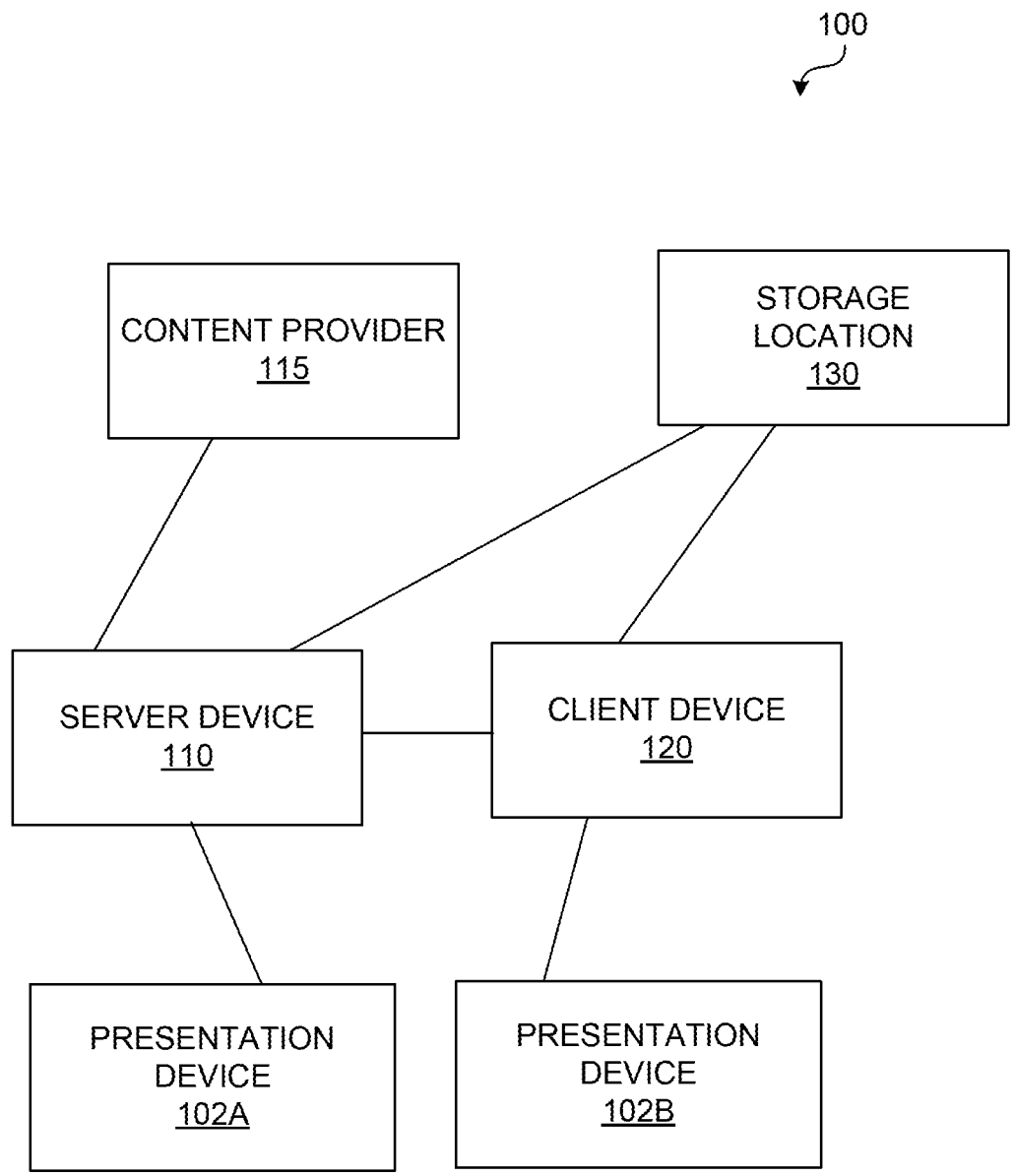
FIG. 1 illustrates an environment of operation of a server device and a client device.

The following detailed description of the invention is merely exemplary in nature and is not intended to limit the invention or the application and uses of the invention. Furthermore, there is no intention to be bound by any theory presented in the preceding background or the following detailed description.

The various embodiments described herein generally provide apparatus, systems, and methods for responding to inoperative commands on a server device. In some embodiments, the disclosed technology facilitates pausing of content being played on a device without creating a bookmark of the location in the content at which the content was paused. In response to receiving the request to pause the content from playing, the server device generates a pause instruction to pause the content from playing. Upon expiry of a timeout interval, the server device automatically transforms the pause instruction into a stop instruction, which when executed causes stopping the content from playing.

In some embodiments, the server device detects an user interaction event, prior to expiry of the timeout interval. Non-limiting examples of the user interaction may be shutting down the server device or a connected client or remote device, switching from the content to a live broadcast program, switching from the content to another content, switching from the content to an application operating on the server device or the remote device, or exiting from the content. In such embodiments, the server device may display a message prompting user selection of an option for confirming stopping the content from playing or generate a message for output by a client device or a remotely connected device. If the user selects the option for stopping the content from playing, then the server device generates a stop instruction and executes the stop instruction which stops the content from playing. Thus, according to disclosed embodiments, a user's request to pause content is converted into a stop instruction with or without (e.g., upon expiry of timeout interval) confirmation from the user.

In some embodiments, instead of generating a bookmark indicating a physical point where the content was stopped, the server device identifies logical information corresponding to the stop instruction, such as a chapter marker and/or associated offset. The logical information is agnostic to a temporal position or a spatial index of a point where the stop instruction was executed and content-specific information usable for identifying a forward playback point that is at or subsequent to the point where the stop instruction was executed.

The disclosed embodiments are related to satellite, cable or other video recording systems for display, presentation, distribution, redistribution, recording, or otherwise any suitable processing of content. In at least one embodiment, the content (e.g., TV shows, sports, movies, music, documentaries) to be received, processed, rendered, outputted and/or communicated may come in any form of a media stream. Exemplary media stream formats include Motion Picture Experts Group (MPEG) standards, Flash, Windows Media and the like. It is to be appreciated that the media stream may be supplied by any source, such as an over-the-air broadcast, a satellite, or cable television distribution system, a digital video disk (DVD) or other optical disk, the Internet or other communication networks, and the like. In at least one embodiment, the media data may be associated with supplemental data that includes text data, control data, timing information, and closed captioning data or subtitles. Particular portions of the closed captioning data may be associated with specified portions of the media data.

Generally, a media stream is a contiguous block of associated audio and video data that may be transmitted to, and received by, an electronic device, such as a terrestrial ("over-the-air") television receiver, a cable television receiver, a satellite television receiver, an Internet connected television or television receiver, a computer, a portable electronic device, or the like. In at least one embodiment, a media stream includes an event. The event may be a contiguous block of programming from a television channel (e.g., an episode of a television show) or other identifiable media content. For example, the event may correspond to the programming on a single channel between 7:00 and 8:00, which may correspond with a single episode of a television program.

Further, a media stream may be delivered by any transmission method, such as broadcast, multicast, simulcast, closed circuit, pay-per-view, on-demand, over-the-top (by "streaming," file transfer, or other means), or other methods. Additionally, the media stream may be transmitted by way of any communication technology, such as by satellite, wire or optical cable, wireless, or other means. The media stream may also be transferred over any type of communication network, such as the Internet or other wide area network, a local area network, a private network, a mobile communication system, a terrestrial television network, a cable television network, and a satellite television network.

In some embodiments, the content may be paused on one device and resumed on another device. A device may be a server device or a client device. An illustrative example is the Hopper® set top box device available from DISH Network L.L.C. of Englewood, Colo. Another illustrative example of a server device is a remote cloud server coupled to the server device. An example of a client device is the Joey® set top box device available from DISH Network L.L.C. Another exemplary example of a client device is the DISH Anywhere application that operates on a mobile phone or tablet. The disclosed technology is not limited to the Hopper/Joey environment, however, and equivalent concepts could be applied in any number of other products from any number of other manufacturers or content providers.

The term "playing" or "playing of content" can include playback of a plurality of frames of content or playback of a plurality of temporally-ordered or sequentially-ordered content. The term "playing" is used interchangeably with the term "playback." Such references will be clear from the context in which the term(s) has/have been used.

FIG. 1 illustrates an environment of operation of a server device and a client device. The system of FIG. 1 is operable for delivery of audio visual content to users in multiple rooms or floors of a premises, e.g., in a household, a mall, a hotel, a restaurant, or any other facility. The system 100 includes a server device 110, a client device 120, presentation devices 102A, 102B, storage location 130, and content provider 115. Server device 110 and client device 120 are coupled to their associated presentation devices 102A, 102B respectively. For example, in a household environment, server device 110 and presentation device 102A may be located in the main living room. Client device 120 and presentation device 102B may be located in the first bedroom.

Content information associated with the content may be provided by the content provider 115, or by another media source. The content provider 115 provides audiovisual streams of content to the server device 110 and/or client device 120. The content provider 115 may utilize one or more distribution networks to transmit the content to the server device 110 and/or the client device 120. Examples of content providers 115 may include a cable company, a satellite broadcasting company, a television network, an on-demand media streaming service, a pay-per-view media streaming service, and/or an over-the-top media streaming service.

The content may include audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized.

The server device 110 and/or the client device 120 may access content and/or content information in various ways. For example, the server device 110 and/or the client device 120 may access a television channel by demodulating and decrypting an audiovisual stream from the content provider 115. The server device 110 and/or the client device 120 may access an over-the-top media streaming service by logging into a remote server and downloading the content over a communication network.

The communication network may be any network capable of transmitting audiovisual events and/or content information. Exemplary communications networks include over-the-air, satellite, and cable television networks, as well as wireless communication networks, public switched telephone networks (PSTN), local area networks (LAN), and wide area networks (WAN) providing data communication services and/or Internet access. The communication network may utilize any desired combination of wired (e.g., cable and fiber) and/or wireless (e.g., cellular, satellite, microwave, and radio frequency) communication mediums and any desired network topology (or topologies when multiple mediums are utilized).

The server device 110 and/or the client device 120 of FIG. 1 may be any device capable of receiving audiovisual streams of sporting events from the content provider 115. For example, in the case of the content provider 115 being a television network, the server device 110 and/or the client device 120 may be a set-top box configured to communicate with the television network. The server device 110 and/or the client device 120 may also be a digital video recorder (DVR), a computer, a portable electronic device, or similar device configured to communicate with the content provider 115 and one or more storage locations 130. In some embodiments, storage location 130 is a remote cloud server storage communicatively coupled to the server device 110 and client device 120. In some embodiments, storage location 130 is a local storage of server device 110.

According to disclosed embodiments, in response to receiving a request to pause content from playing, server device 110 generates a pause instruction to pause the content from playing. Upon expiry of a timeout interval from a time stamp of generating the pause instruction, server device 110 transforms the pause instruction into a stop instruction, which when executed causes the content to stop from being played. In response to detecting a user interaction event prior to expiry of a timeout interval from a timestamp of executing the pause instruction, in some embodiments, server device 110 outputs a message prompting the user to confirm that the content will be automatically stopped. Upon receiving user selection of the option for stopping the content from playing, server device 110 generates a stop instruction to stop the content from playing and executes the stop instruction to stop the content from playing. In some embodiments, instead of generating a bookmark indicating a physical point where the content was stopped, the server device identifies logical information corresponding to the stop instruction. The logical information is agnostic to a temporal position or a spatial index of a point where the stop instruction was executed and content-specific information usable for identifying a forward playback point that is at or subsequent to the point where the stop instruction was executed. The logical information corresponding to the stop instruction is saved at storage location 130.

In some implementations, server device 110 and/or client device 120 generates an electronic program guide (EPG) that shows various programming events (e.g., pre-recorded content, content that is contemporaneously recorded, content that is being played in one or more TV/satellite networks, content that is available from online content providers such as Netflix, or content scheduled to be recorded in future) associated with server device 110 and/or client device 120.

Server device 110 and/or client device 120 may include an application programming interface (API) configured to poll a wireless access point of the premises to monitor WiFi connectivity between the access point and its wireless client(s), e.g., one or more server devices 110 and/or client devices 120. If the WiFi or other network connectivity is sufficient, server device 110 and/or client device 120 may retrieve the logical information corresponding to the stop instruction from storage location 130. Thus, according to some embodiments, content paused at one device can be resumed to play on the same device or another device.

In addition to the content, server device 110 and/or client device 120 may receive content information that provides information about content including dates, times, from content providers 115 or from other data sources. Server device 110 and/or client device 120 may display the content information on an EPG via presentation devices 102A, 102B.

Presentation devices 102A, 102B may be configured to receive the content in the form of an audio/video stream from server device 110 and/or client device 120 for presentation of the audio/video stream to a user. Examples of the presentation devices may include a television, a video monitor, or similar device capable of presenting audio and video information to a user. Server device 110 and/or client device 120 may be communicatively coupled to presentation devices 102A, 102B through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, presentation devices 102A, 102B may be integrated with server device 110 and/or client device 120. For example, each of a computer or a portable electronic device may serve as both the server device 110 and the presentation device 102A by providing the capability of receiving content from the content provider 115, and presenting the received content to a user. In another implementation, a cable-ready television may include a converter device for receiving content from the content provider 115, and displaying the content to a user.

Figure 2:
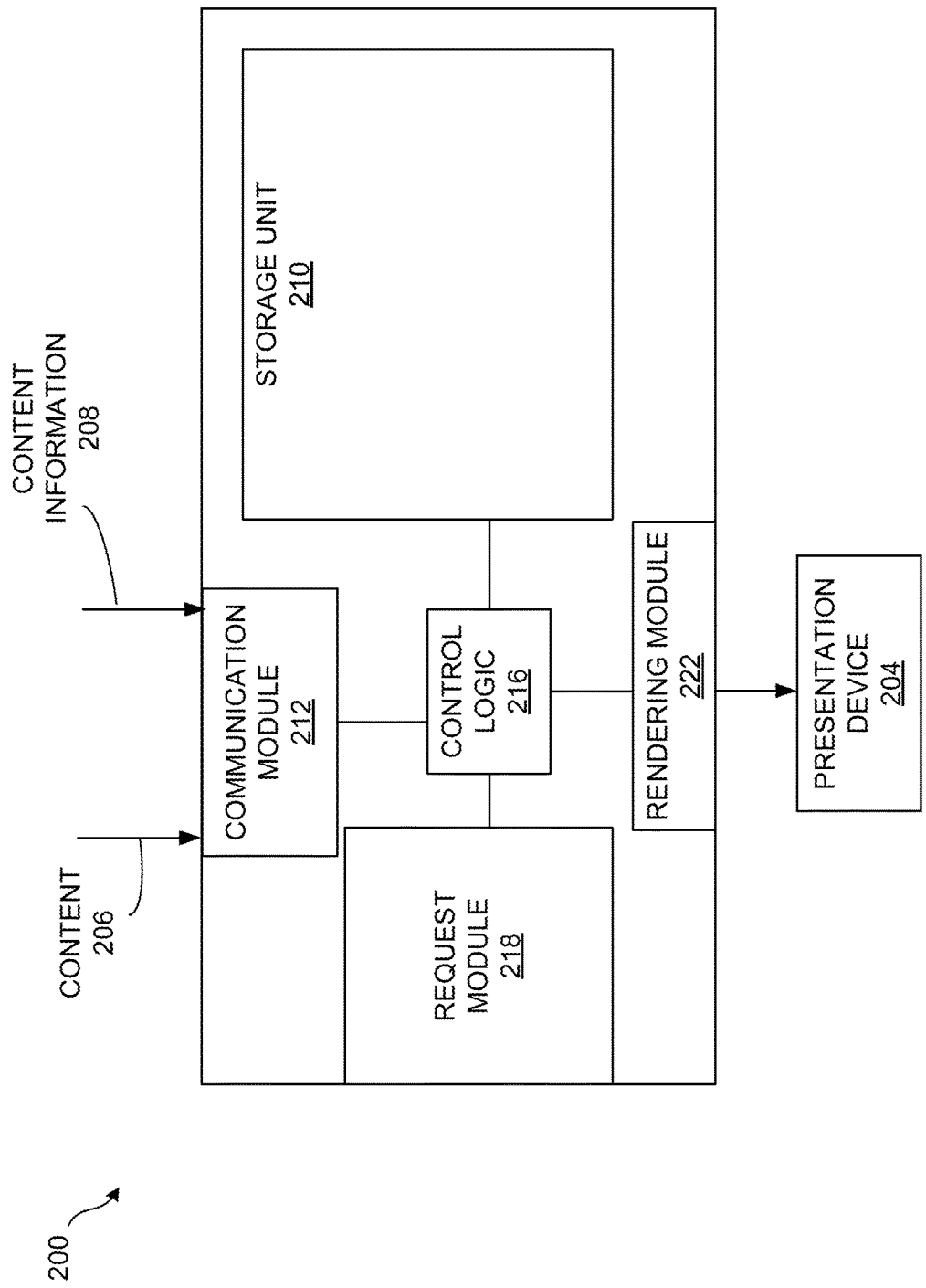
FIG. 2 illustrates an example of a device associated with interactive playback of content.

FIG. 2 illustrates an example of a device 200 in accordance with disclosed embodiments for interactive playback of content. The device 200 in FIG. 2 is a generic representation—functioning as a server device and/or a client device, depending on the transmission context. Device 200 includes a request module 218, a communication module 212, control logic 216, rendering module 222, and storage unit 210. Communication module 212 receives content 206 and content information 208 from a content provider.

Request module 218 receives requests to pause or stop content from being played. Requests to stop or pause content may come from a user, e.g., operating a remote control that controls the server device, directly controlling the server device, or a mobile device application executable on a user's computing device.

Control logic 216 is operable to analyze pause requests, generation of pause instructions, and transforming a pause instruction into a stop instruction in the event of a timeout. Control logic 216 detects user interaction event prior to expiry of a timeout interval from a timestamp of executing the stop instruction. The user interaction event may be shutting down the server device, switching from the content to a live broadcast program, switching from the content to another content, exiting from the content, or any other suitable user interaction. Control logic 216 in the server device identifies logical information where the content was stopped. Also, the control logic 216 may receive content 206 and content information 208 from communication module 212 for generating display of information relating to the content. Further, the control logic 216 coordinates the output of content or content information (e.g., on an EPG) to the rendering module 222. Control logic 216 may also receive user inputs/requests/instructions, e.g., via user interface icons on the EPG received via a remote control operated by a user interacting with the EPG. For example, the user input may command device 200 to record, replay, delete, or render content. Control logic 216 may then instruct the communication module 212 to tune to the particular broadcast channel carrying the content. Upon determining a match between a current time and the time of the recording event, the control logic 216 may record the content corresponding to the recording event.

Rendering module 222 may render the content or the EPG for display on presentation device 204. Rendering module 222 renders the audiovisual event and outputs an audio/video stream to the presentation device 204.

One or more storage units 210 may be included internal and/or external to device 200. Storage unit 210 may store recorded content and the information relating to the content streamed from content providers. In some embodiments, storage unit 210 may correspond to storage location 130 shown in FIG. 1. In alternate embodiments, device 200 may include other components, modules, elements, or devices not illustrated for the sake of brevity.

Figure 3:
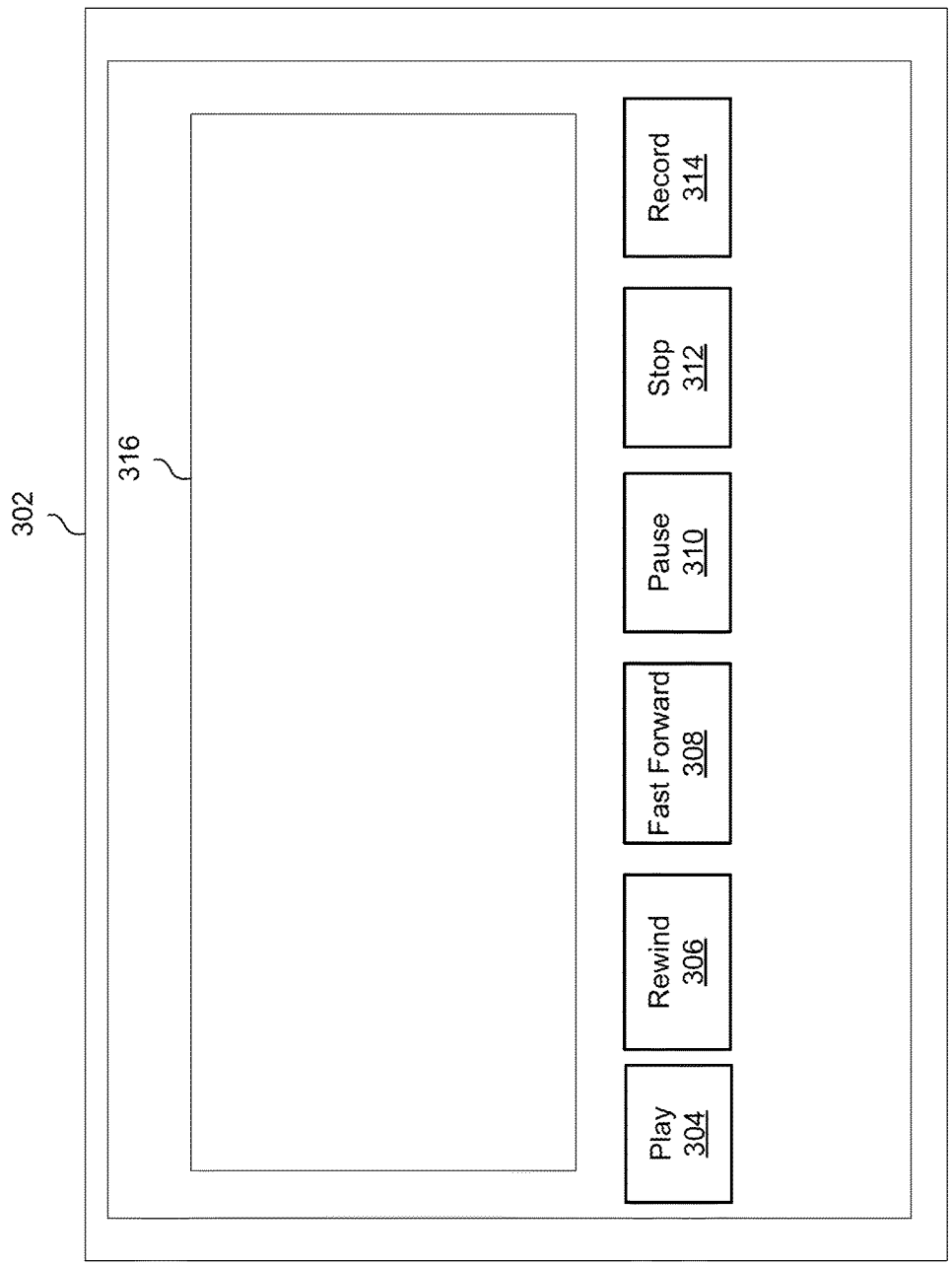
FIG. 3 illustrates an example screen associated with a user's selection of an inoperative command on a server device.

FIG. 3 illustrates an example screen associated with a server device. Content 316 is displayed on a monitor 302. In some embodiments, the server device displays play button 304, rewind button 306, fast forward button 308, pause button 310, stop button 312, and record button 314. When a user chooses to stop playback of content 316, he or she clicks on stop button 312 to stop playing content 316. In response to receiving the request to stop the content from playback on the server device, the server device generates a stop instruction to stop the content from playback. In disclosed embodiments, the server device saves (at a storage location communicatively coupled to the server device) logical information corresponding to a position where the content was stopped at the server device. In some instances, the content may be delivered in a session setup by a provider of the content. A session typically expires after a session timeout interval. Thus, in some embodiments, the server device may be configured for communicating (to the provider of the content) a request for suspending the session, in response to generating the pause instruction.

In some use cases, a user may choose to pause playing the content 316. Upon receiving user selection (e.g., a user clicking on pause button 310) of an option to pause the content, the server device generates a pause instruction to pause the content. In some implementations, in response to determining that the user has selected to pause the content, the server device prompts a message to confirm the user selection of the option to pause the content. In some embodiments, the message to confirm user selection of the option to pause the content is prompted after a time interval subsequent to receiving user selection of the option to pause the content. For example, 30 seconds after the user clicks on pause button 310, a message to confirm user selection of the option to pause the content is prompted. The message may be "Are you sure you want to pause content from being played?"

In some embodiments, the server device may transform a "pause command" to a "stop action" after a timeout interval. For example, 1 minute after the message to confirm user selection of the option to pause the content is prompted, the server device may automatically transform the "pause" into a "stop." In some embodiments, this transformation occurs regardless or independent of whether or not a user responds to the message prompting confirmation of the user selection to pause the content. In some instances, the content may be delivered in a session setup by a provider of the content. A session typically expires after a session timeout interval. Thus, in some embodiments, the server device may be configured for communicating (to the provider of the content) a request for suspending the session, in response to generating the pause instruction. According to disclosed embodiments, stopping content from playback on the server device maybe in response to a user selection of stop, or a transformation of a pause command into a stop command. The transformation may be either automatic (e.g., without involving a user response) or the transformation may be based on a confirmation from the user.

In some use cases, a user may choose to stop playback of the content 316. Upon receiving user selection (e.g., a user clicking on stop button 312) of an option to stop the content, the server device generates a stop instruction to stop the content. In some implementations, in response to determining that the user has selected to stop the content, the server device prompts a message to confirm the user selection of the option to stop the content. In some embodiments, the message to confirm user selection of the option to stop the content is prompted after a time interval subsequent to receiving user selection of the option to stop the content. For example, 30 seconds after the user clicks on stop button 312, the message to confirm user selection of the option to stop the content is prompted. The message may be "Are you sure you want to stop content from being played?"

Figure 4A:
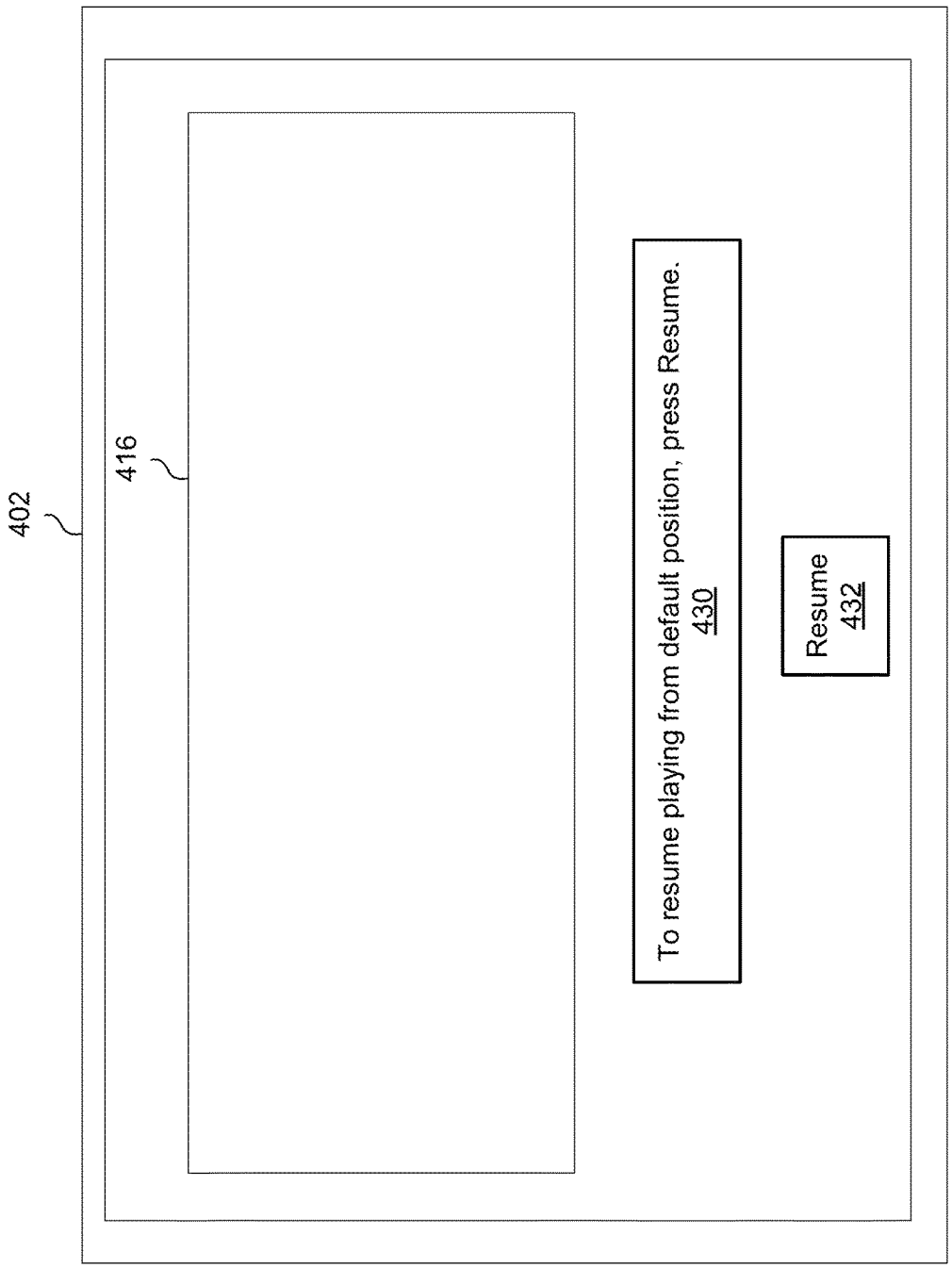

FIGS. 4A and 4B illustrate example screens associated with a server/client device. Referring to FIG. 4A, content 416 may be resumed to be played on monitor 402. In some embodiments, the server/client device provides an option to resume playback of the content from a default position. The default position can, for example, have an exact or an inexact relationship to the position in the content where the content was stopped. Thus, if a user chooses to resume playing the content from a default position, the user can click on resume button 432. In some instances, the transformation of a pause command into a stop action is automatically determined by the server device, based on expiry of a timeout interval.

Referring to FIG. 4B, content 416 may be resumed to be played on monitor 402. In some embodiments, the server device provides an option to resume playing content (e.g., stopped at a server device or a client device) from a user-specified position. The user-specified position can, for example, be prior to or subsequent to the position where the content was stopped at the server/client device. In these embodiments, the destination device displays a slider 458 on slider bar 456 to allow the user to specify a position to resume playing the content. Slider bar 456 can be representative of the temporal or sequential ordering of the content. The user-specified position may be prior to, at, or subsequent to the position where the content was stopped at the server/client device.

In applications involving the content being delivered in session-based environments, the destination device may be configured for communicating (to the provider of the content) a request for resuming an already suspended session, in response to generating the playing instruction. For example, a session may be suspended based on a request communicated from the server device. According to disclosed embodiments, a session may be suspended in response to a pause instruction or a stop instruction generated by a server device.

In some implementations, a destination device displays a default (first) option in a first screen (e.g., shown in FIG. 4A) and a second option in a successive second screen (e.g., shown in FIG. 4B). Based on determining whether the user selected the first option or the second option, the destination device resumes playback of the content at the destination device from a playback point according to the first option or the second option.

Figure 5:
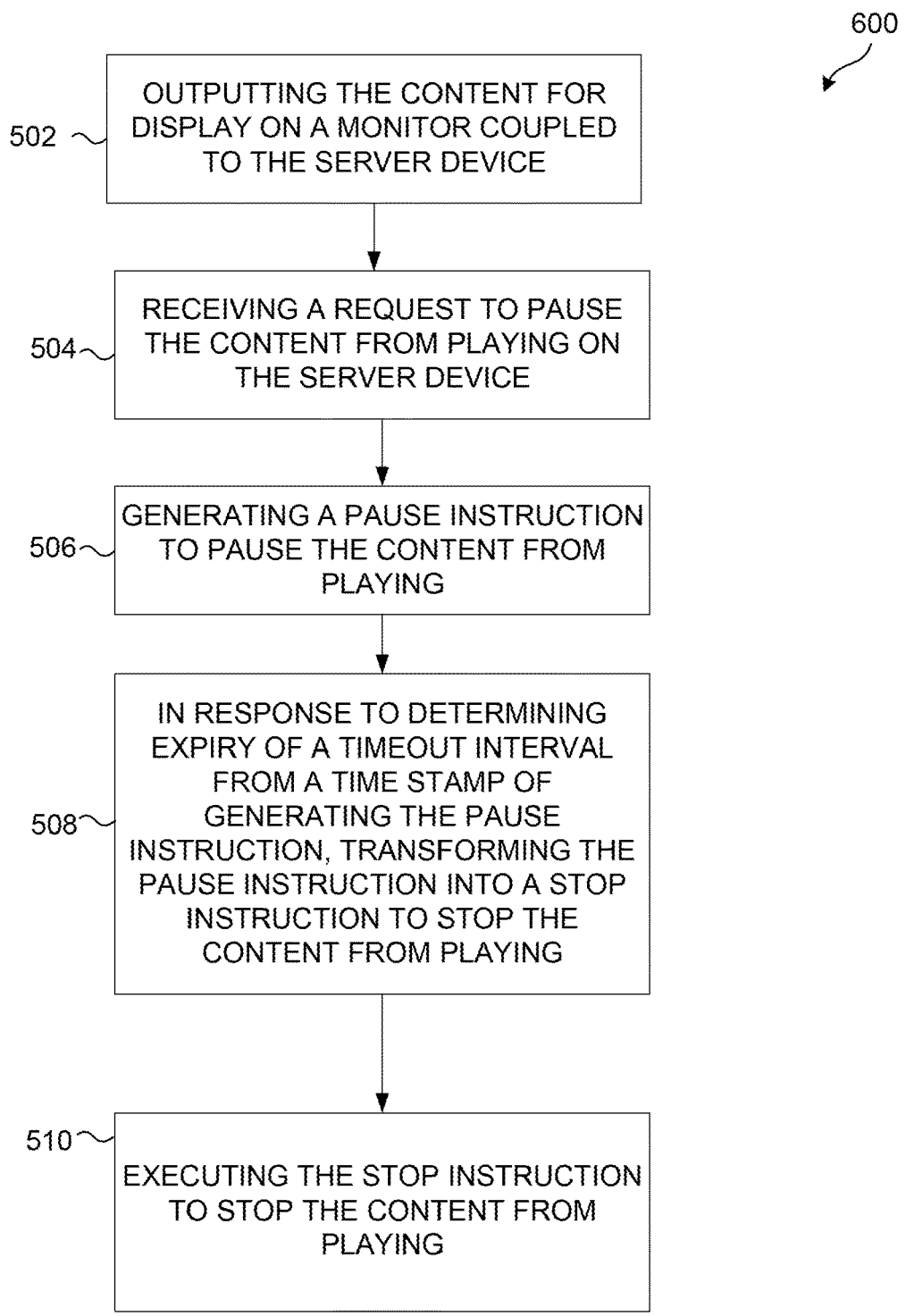
FIG. 5 illustrates an embodiment of a process for responding to inoperative commands on a device, based upon detecting no user interaction within a timeout interval.

FIG. 5 illustrates an embodiment of a process for responding to inoperative commands on a device, based upon detecting no user interaction within a timeout interval. The device receiving the inoperative command (e.g., a pause) can be a server device or a client device. The process discussed in FIG. 5 can be configured to run on a server device. At step 502, the process outputs the content for display on a monitor coupled to the device. At step 504, the process receives a request to pause the content from playing on the server device. In response to receiving the request to pause the content from playing, the process generates (step 506) a pause instruction to pause the content from playing. In some scenarios, the process is configured to run a timer to detect a timeout interval from the time of generating the pause instruction. In response to determining expiry of the timeout interval from the time of generating the pause instruction, the process transforms (step 508) the pause instruction into a stop instruction to stop the content from playing and executes (step 510) the stop instruction to stop the content from playing.

In some embodiments, the process receives (e.g., from a client device) a request to resume playback of the content on the client device that is different from the server device. In response to the request, the process generates (at the server) a resume instruction including the forward playback point that is at or subsequent to the point where the stop instruction was executed at the server device. The process sends the content and the resume instruction to the client device to resume playing the content on the client device.

Figure 6:
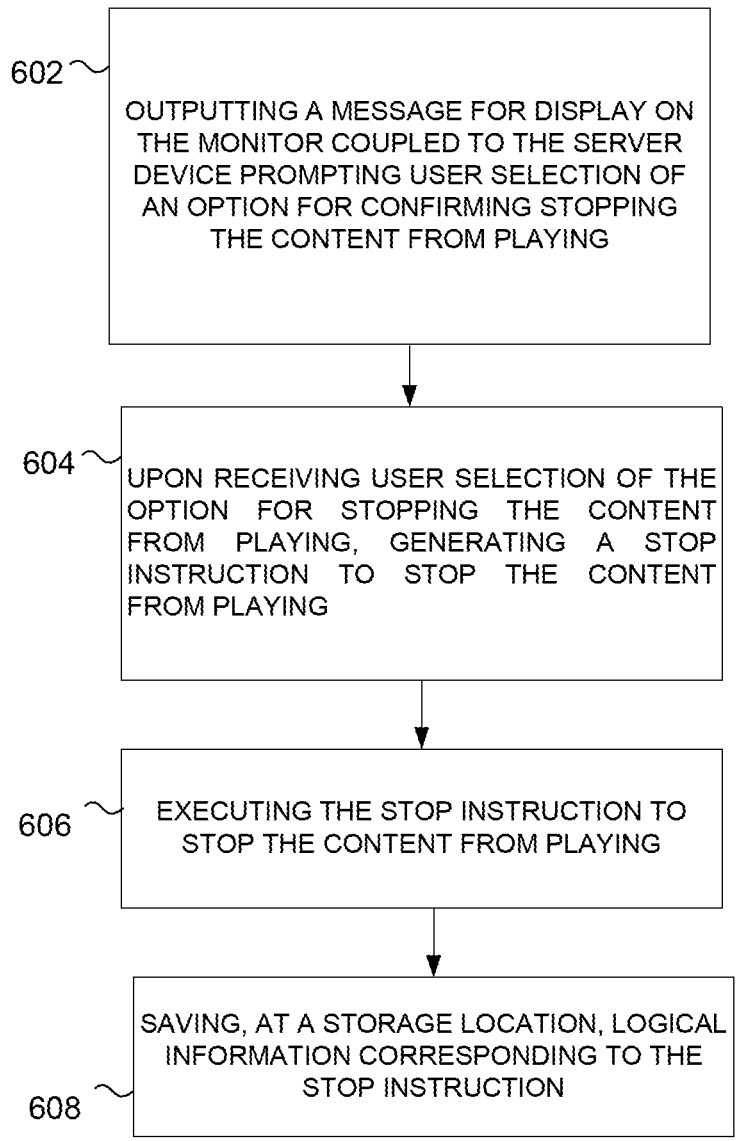
FIG. 6 illustrates an embodiment of a process for responding to inoperative commands on a device, based upon detecting user interaction prior to expiry of a timeout interval.

FIG. 6 illustrates an embodiment of a process for responding to inoperative commands on a device, based upon detecting user interaction prior to expiry of a timeout interval. The process discussed in FIG. 6 can be configured to run on a server device. At step 602, the process outputs a message for display on the monitor coupled to the server device prompting user selection of an option for confirming stopping the content from playing. Upon receiving user selection of the option for stopping the content from playing, the process generates (step 604) a stop instruction to stop the content from playing and executes (step 606) the stop instruction to stop the content from playing. At step 608, the process saves (at a storage location) logical information corresponding to the stop instruction. For example, the logical information can be (i) agnostic to a temporal position or a spatial index of a point where the stop instruction was executed and (ii) content-specific information usable for identifying a forward playback point that is at or subsequent to the point where the stop instruction was executed. In some applications, the logical information corresponding to the stop instruction is expressed as at least one of: a percentage of the completion of the play of the content, a last-encountered commercial break in the content, a last-encountered chapter in the content, or a last-encountered segment of a game.

In some applications, the logical information corresponding to the stop instruction is expressed as a last-encountered video frame in the content. For example, if the content is in MPEG format, the video frame can be an I-frame, a P-frame, or a B-frame.

In some embodiments, the process receives a request to resume playback of the content on the server device and generates a resume instruction to resume playing the content at the server device from the forward playback point that is at or subsequent to the point where the stop instruction was executed. In some applications, the content can be delivered via an online session from a content provider. In these applications, the process communicates (to the content provider) a request for suspending the session, in response to executing the stop instruction. In some applications, the process receives (prior to expiry of the session timeout interval) a request to resume playback of the content on the server device or the client device. The process can communicate (to the content provider) an instruction for joining the suspended session to resume playing the content.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of responding to inoperative commands on a server device comprising:
   outputting the content for display on a monitor coupled to the server device;
   receiving a request to pause the content from playing on the server device;
   in response to receiving the request to pause the content from playing:
      generating a pause instruction to pause the content from playing;
      in response to determining expiry of a timeout interval from a time stamp of generating the pause instruction:
         transforming the pause instruction into a stop instruction to stop the content from playing;
         executing the stop instruction to stop the content from playing;
      in response to detecting a user interaction event prior to expiry of a timeout interval from a timestamp of executing the pause instruction:
         outputting a message for display on the monitor coupled to the server device prompting user selection of an option for confirming stopping the content from playing;

upon receiving user selection of the option for stopping the content from playing:
generating a stop instruction to stop the content from playing;
executing the stop instruction to stop the content from playing;
saving, at a storage location, logical information corresponding to the stop instruction;
generating multiple options for resuming playback of the content, wherein a first option of the multiple options is for resuming the playback from a default position, and wherein a second option of the multiple options is for resuming playback of the content from a user-specified position, wherein the user specified position is prior to or subsequent to the default position;
receiving a user selection of the second option to resume playback of the content on the server device from the user-specified position, the user selection including the user-specified position; and
generating a resume instruction to resume the playback of the content at the server device from the user-specified position.

2. The method of claim 1, wherein no user interaction event is detected during the timeout interval.

3. The method of claim 1, wherein the logical information is (i) agnostic to a temporal position or a spatial index of a point where the stop instruction was executed and (ii) content-specific information usable for identifying a forward playback point that is at or subsequent to the point where the stop instruction was executed.

4. The method of claim 1, wherein the user interaction event includes at least one of: shutting down the server device, switching from the content to a live broadcast program, switching from the content to another content, or exiting from the content.

5. The method of claim 1, wherein the user-specified position is at or subsequent to the point where the stop instruction was executed.

6. The method of claim 1, further comprising:
receiving, from a client device, a request to resume playback of the content on the client device, wherein the client device is different from the server device;
generating, at the server, a resume instruction including the forward playback point that is at or subsequent to the point where the stop instruction was executed at the server device; and
sending, to the client device, the content and the resume instruction to resume playing the content on the client device.

7. The method of claim 1, wherein the server device is a digital video recorder (DVR), and wherein the storage location is a remote server communicatively coupled to the DVR.

8. The method of claim 7, wherein the remote server communicatively coupled to the DVR is a cloud server.

9. The method of claim 1, wherein the server device is a digital video recorder (DVR), and wherein the storage location is a database locally coupled to the DVR.

10. The method of claim 1, wherein the logical information corresponding to the stop instruction is expressed as at least one of: a percentage of the completion of the play of the content, a last-encountered commercial break in the content, a last-encountered chapter in the content, or a last-encountered segment of a game.

11. The method of claim 1, wherein the logical information corresponding to the stop instruction is expressed as a last-encountered video frame in the content.

12. The method of claim 11, wherein the content is in MPEG format, and wherein the video frame includes one of: an I-frame, a P-frame, or a B-frame.

13. The method of claim 1, wherein the content is delivered in an online session from a content provider, wherein the session expires after a session timeout interval, further comprising:
communicating, to the content provider, a request for suspending the session, in response to executing the stop instruction.

14. The method of claim 13, further comprising:
receiving, prior to expiry of the session timeout interval, a request to resume playback of the content on the server device;
communicating, to the content provider, a resume instruction that causes joining the suspended session to resume playing the content.

15. The method of claim 1, wherein in response to executing the stop instruction includes:
outputting a message for display on the monitor coupled to the server device indicating an operation corresponding to the request to pause the content from playing on the server device.

16. A non-transitory machine-readable storage medium having stored thereon instructions which, when executed by a processor of a server device, cause the processor to:
output content for display on a monitor coupled to the server device;
receive a request to pause the content from playing on the server device;
in response to receiving the request to pause the content from playing:
generate a pause instruction to pause the content from playing;
in response to determining expiry of a timeout interval from a time stamp of generating the pause instruction:
transform the pause instruction into a stop instruction to stop the content from playing, wherein no user interaction event is detected during the timeout interval;
execute the stop instruction to stop the content from playing;
in response to detecting a user interaction event prior to expiry of the timeout interval:
output a message for display on the monitor coupled to the server device prompting user selection of an option for confirming stopping the content from playing;
upon receiving user selection of the option for stopping the content from playing:
generate a stop instruction to stop the content from playing;
execute the stop instruction to stop the content from playing;
save, at a storage location, logical information corresponding to the stop instruction, wherein the logical information is (i) agnostic to a temporal position or a spatial index of a point where the stop instruction was generated and (ii) content-specific information representative of a forward playback point that is at or subsequent to the point where the stop instruction was generated;
generate multiple options for resuming playback of the content, wherein a first option of the multiple options is for resuming the playback from a default position, and wherein a second option of the multiple options is for resuming playback of the content from a user-specified position, wherein the user specified position is prior to or subsequent to the default position;

receive a user selection of the second option to resume playback of the content on the server device from the user-specified position, wherein the user selection includes the user-specified position; and generate a resume instruction to resume the playback of the content at the server device from the user-specified position.

17. The non-transitory machine-readable storage medium of claim 16, wherein the user interaction event includes at least one of: shutting down the server device, switching from the content to a live broadcast program, switching from the content to another content, or exiting from the content.

18. The non-transitory machine-readable storage medium of claim 16, wherein user-specified position is at or subsequent to the point where the stop instruction was generated.

19. The non-transitory machine-readable storage medium of claim 16, wherein the instructions further cause the processor to:

receiving, from a client device, a request to resume playback of the content on the client device, wherein the client device is different from the server device;

generating, at the server, a resume instruction including the forward playback point that is at or subsequent to the point where the stop instruction was generated at the server device; and sending, to the client device, the content and the resume instruction to resume playing the content on the client device.

20. A method of responding to inoperative commands on a server device comprising:

outputting the content for display on a monitor coupled to the server device;

receiving a request to pause the content from playing on the server device;

in response to receiving the request to pause the content from playing:

generating a pause instruction to pause the content from playing;

in response to determining expiry of a timeout interval from a time stamp of generating the pause instruction:

transforming the pause instruction into a stop instruction to stop the content from playing, wherein no user interaction event is detected during the timeout interval;

executing the stop instruction to stop the content from playing;

in response to detecting a user interaction event prior to expiry of the timeout interval:

outputting a message for display on the monitor coupled to the server device prompting user selection of an option for confirming stopping the content from playing;

upon receiving user selection of the option for stopping the content from playing:

generating a stop instruction to stop the content from playing;

executing the stop instruction to stop the content from playing;

saving, at a storage location, logical information corresponding to the stop instruction, wherein the logical information is (i) agnostic to a temporal position or a spatial index of a point where the stop instruction was generated and (ii) content-specific information representative of a forward playback point that is at or subsequent to the point where the stop instruction was generated;

generating multiple options for resuming playback of the content, wherein a first option of the multiple options is for resuming the playback from a default position, and wherein a second option of the multiple options is for resuming playback of the content from a user-specified position, wherein the user specified position is prior to or subsequent to the default position;

receiving a user selection of the second option to resume playback of the content on the server device from the user-specified position, wherein the user selection includes the user-specified position; and generating a resume instruction to resume the playback of the content at the server device from the user-specified position.

* * * * *